(12) United States Patent
Gil et al.

(10) Patent No.: US 8,176,982 B2
(45) Date of Patent: May 15, 2012

(54) METHOD OF CONTROLLING A RECOVERY AND UPGRADING OPERATION IN A RESERVOIR

(75) Inventors: Henry Gil, Calgary (CA); Andrew Squires, Calgary (CA)

(73) Assignee: Osum Oil Sands Corp. (CA)

( * ) Notice: Subject to any disclaimer, the term of this patent is extended or adjusted under 35 U.S.C. 154(b) by 484 days.

(21) Appl. No.: 12/366,845

(22) Filed: Feb. 6, 2009

(65) Prior Publication Data

US 2009/0194280 A1 Aug. 6, 2009

Related U.S. Application Data

(60) Provisional application No. 61/026,594, filed on Feb. 6, 2008, provisional application No. 61/030,817, filed on Feb. 22, 2008.

(51) Int. Cl.
*E21B 43/24* (2006.01)
*E21B 43/34* (2006.01)

(52) U.S. Cl. ....... 166/272.1; 166/57; 166/266; 166/267; 166/272.3; 166/272.6

(58) Field of Classification Search ................. None
See application file for complete search history.

(56) References Cited

U.S. PATENT DOCUMENTS

| | | |
|---|---|---|
| 604,330 A | 5/1898 | Kibling |
| 1,520,737 A | 12/1924 | Wright |
| 1,634,236 A | 6/1927 | Ranney |
| 1,660,187 A | 2/1928 | Ehrat |
| 1,660,818 A | 2/1928 | Leo |
| 1,722,679 A | 7/1929 | Ranney |
| 1,936,643 A | 10/1929 | Reed |
| 1,735,012 A | 11/1929 | Rich |
| 1,735,481 A | 11/1929 | Uren |
| 1,811,560 A | 6/1931 | Ranney |
| 1,816,260 A | 7/1931 | Lee |
| 1,852,717 A | 4/1932 | Grinnell et al. |
| 1,884,859 A | 10/1932 | Ranney |
| 1,910,762 A | 5/1933 | Grinnell et al. |
| 2,148,327 A | 2/1939 | Smith et al. |
| 2,193,219 A | 3/1940 | Bowie et al. |
| 2,200,665 A | 5/1940 | Bolton |
| 2,210,582 A | 8/1940 | Grosse et al. |
| 2,365,591 A | 12/1944 | Ranney |
| 2,670,801 A | 3/1954 | Sherborne |
| 2,783,986 A | 3/1957 | Nelson et al. |
| 2,786,660 A | 3/1957 | Alleman |
| 2,799,641 A | 7/1957 | Bell |

(Continued)

FOREIGN PATENT DOCUMENTS

CA 986146 3/1976

(Continued)

OTHER PUBLICATIONS

NASR, "Steam Assisted Gravity Drainage (SAGD): A New Oil Production Technology for Heavy Oil and Bitumens", CSEG Recorder, Alberta Research Council, Calgary, Canada, Mar. 2003, p. 42.

(Continued)

*Primary Examiner* — Zakiya W Bates
(74) *Attorney, Agent, or Firm* — Sheridan Ross P.C.

(57) ABSTRACT

A method and system of generating a range of petroleum products from bitumen or heavy oil reservoir by installing wells from a combination of surface and underground wellhead platforms while controlling carbon dioxide emissions during thermal recovery operations are provided.

20 Claims, 4 Drawing Sheets

U.S. PATENT DOCUMENTS

| | | |
|---|---|---|
| 2,823,752 A | 2/1958 | Hellmuth |
| 2,857,002 A | 10/1958 | Pevere et al. |
| 2,888,987 A | 6/1959 | Parker |
| 2,914,124 A | 11/1959 | Ripley, Jr. |
| 2,989,294 A | 6/1961 | Coker |
| 3,017,168 A | 1/1962 | Carr |
| 3,024,013 A | 3/1962 | Rogers et al. |
| 3,034,773 A | 5/1962 | Legatski |
| 3,207,221 A | 9/1965 | Cochran et al. |
| 3,227,229 A | 1/1966 | Wakefield, Jr. |
| 3,259,186 A | 7/1966 | Dietz |
| 3,285,335 A | 11/1966 | Reistle, Jr. |
| 3,333,637 A | 8/1967 | Prats |
| 3,338,306 A | 8/1967 | Cook |
| 3,353,602 A | 11/1967 | Geertsma |
| 3,362,751 A | 1/1968 | Tinlin |
| 3,386,508 A | 6/1968 | Bielstein et al. |
| 3,455,392 A | 7/1969 | Prats |
| 3,456,730 A | 7/1969 | Lange |
| 3,474,863 A | 10/1969 | Deans et al. |
| 3,530,939 A | 9/1970 | Turner et al. |
| 3,613,806 A | 10/1971 | Malott |
| 3,620,313 A | 11/1971 | Elmore et al. |
| 3,678,694 A | 7/1972 | Haspert |
| 3,759,575 A | 9/1973 | Boyd et al. |
| 3,768,559 A | 10/1973 | Allen et al. |
| 3,778,107 A | 12/1973 | Haspert |
| 3,784,257 A | 1/1974 | Lauber et al. |
| 3,833,059 A | 9/1974 | Sisson |
| 3,838,738 A | 10/1974 | Redford et al. |
| 3,882,941 A | 5/1975 | Pelofsky |
| 3,884,261 A | 5/1975 | Clynch |
| 3,888,543 A | 6/1975 | Johns |
| 3,922,148 A | 11/1975 | Child |
| 3,922,287 A | 11/1975 | Pawson et al. |
| 3,924,895 A | 12/1975 | Leasure |
| 3,937,025 A | 2/1976 | Alverez-Calderon |
| 3,941,423 A | 3/1976 | Garte |
| 3,948,323 A | 4/1976 | Sperry et al. |
| 3,954,140 A | 5/1976 | Hendrick |
| 3,960,408 A | 6/1976 | Johns |
| 3,986,557 A | 10/1976 | Striegler et al. |
| 3,992,287 A | 11/1976 | Rhys |
| 4,046,191 A | 9/1977 | Neath |
| 4,055,959 A | 11/1977 | Fritz |
| 4,064,942 A | 12/1977 | Prats |
| 4,067,616 A | 1/1978 | Smith et al. |
| 4,072,018 A | 2/1978 | Alvarez-Calderon |
| 4,076,311 A | 2/1978 | Johns |
| 4,085,803 A | 4/1978 | Butler |
| 4,099,388 A | 7/1978 | Husemann et al. |
| 4,099,570 A | 7/1978 | Vandergrift |
| 4,099,783 A | 7/1978 | Verty et al. |
| 4,106,562 A | 8/1978 | Barnes et al. |
| 4,116,487 A | 9/1978 | Yamazaki et al. |
| 4,144,935 A | 3/1979 | Bridges et al. |
| 4,149,597 A | 4/1979 | Redford et al. |
| 4,152,027 A | 5/1979 | Fujimoto et al. |
| 4,160,481 A | 7/1979 | Turk et al. |
| 4,165,903 A | 8/1979 | Cobbs |
| 4,167,290 A | 9/1979 | Yamazaki et al. |
| 4,203,626 A | 5/1980 | Hamburger |
| 4,209,268 A | 6/1980 | Fujiwara et al. |
| 4,216,999 A | 8/1980 | Hanson |
| 4,224,988 A | 9/1980 | Gibson et al. |
| 4,227,743 A | 10/1980 | Ruzin et al. |
| 4,236,640 A | 12/1980 | Knight |
| 4,249,777 A | 2/1981 | Morrell et al. |
| 4,257,650 A | 3/1981 | Allen |
| 4,265,307 A | 5/1981 | Elkins |
| 4,279,743 A | 7/1981 | Miller |
| 4,285,548 A | 8/1981 | Erickson |
| 4,289,354 A | 9/1981 | Zakiewicz |
| 4,296,969 A | 10/1981 | Willman |
| 4,406,499 A | 9/1983 | Yildirim |
| 4,410,216 A | 10/1983 | Allen |
| 4,434,849 A | 3/1984 | Allen |
| 4,440,449 A | 4/1984 | Sweeney |
| 4,445,723 A | 5/1984 | McQuade |
| 4,455,216 A | 6/1984 | Angevine et al. |
| 4,456,305 A | 6/1984 | Yoshikawa |
| 4,458,945 A | 7/1984 | Ayler et al. |
| 4,458,947 A | 7/1984 | Hopley et al. |
| 4,463,988 A | 8/1984 | Bouck et al. |
| 4,486,050 A | 12/1984 | Snyder |
| 4,494,799 A | 1/1985 | Snyder |
| 4,502,733 A | 3/1985 | Grubb |
| 4,505,516 A | 3/1985 | Shelton |
| 4,533,182 A | 8/1985 | Richards |
| 4,536,035 A | 8/1985 | Huffman et al. |
| 4,545,435 A | 10/1985 | Bridges et al. |
| 4,566,961 A | 1/1986 | Diaz et al. |
| 4,575,280 A | 3/1986 | Hemphill et al. |
| 4,595,239 A | 6/1986 | Ayler et al. |
| 4,601,607 A | 7/1986 | Lehmann |
| 4,603,909 A | 8/1986 | LeJeune |
| 4,607,888 A | 8/1986 | Trent et al. |
| 4,607,889 A | 8/1986 | Hagimoto et al. |
| 4,611,855 A | 9/1986 | Richards |
| 4,682,471 A | 7/1987 | Wagner |
| 4,699,709 A | 10/1987 | Peck |
| 4,753,666 A | 6/1988 | Pastor et al. |
| 4,774,470 A | 9/1988 | Takigawa et al. |
| 4,793,736 A | 12/1988 | Thompson et al. |
| 4,808,030 A | 2/1989 | Takegawa |
| 4,856,936 A | 8/1989 | Hentschel et al. |
| 4,911,578 A | 3/1990 | Babendererde |
| 4,946,579 A | 8/1990 | Ocelli |
| 4,946,597 A | 8/1990 | Sury |
| 4,983,077 A | 1/1991 | Sorge et al. |
| 5,016,710 A | 5/1991 | Renard et al. |
| 5,032,039 A | 7/1991 | Hagimoto et al. |
| 5,051,033 A | 9/1991 | Grotenhofer |
| 5,125,719 A | 6/1992 | Snyder |
| 5,141,363 A | 8/1992 | Stephens |
| 5,174,683 A | 12/1992 | Grandori |
| 5,205,613 A | 4/1993 | Brown, Jr. |
| 5,211,510 A | 5/1993 | Kimura et al. |
| 5,217,076 A | 6/1993 | Masek |
| 5,280,814 A | 1/1994 | Stroh |
| 5,316,664 A | 5/1994 | Gregoli et al. |
| 5,330,292 A | 7/1994 | Sakanishi et al. |
| 5,339,898 A | 8/1994 | Yu et al. |
| 5,354,359 A | 10/1994 | Wan et al. |
| 5,446,980 A | 9/1995 | Rocke |
| 5,484,232 A | 1/1996 | Hayashi et al. |
| 5,516,967 A | 5/1996 | Pandey et al. |
| 5,534,136 A | 7/1996 | Rosenbloom |
| 5,534,137 A | 7/1996 | Griggs et al. |
| 5,626,726 A | 5/1997 | Kong et al. |
| 5,655,605 A | 8/1997 | Matthews |
| 5,656,136 A | 8/1997 | Gayaut et al. |
| 5,697,676 A | 12/1997 | Kashima et al. |
| 5,767,680 A | 6/1998 | Torres-Verdin et al. |
| 5,785,736 A | 7/1998 | Thomas et al. |
| 5,831,934 A | 11/1998 | Gill et al. |
| 5,852,262 A | 12/1998 | Gill et al. |
| 5,879,057 A | 3/1999 | Schwoebel et al. |
| 5,890,771 A | 4/1999 | Cass |
| 6,003,953 A | 12/1999 | Huang et al. |
| 6,017,095 A | 1/2000 | DiMillo |
| 6,027,175 A | 2/2000 | Seear et al. |
| 6,190,536 B1 | 2/2001 | Lokhandwala et al. |
| 6,206,478 B1 | 3/2001 | Uehara et al. |
| 6,257,334 B1 | 7/2001 | Cyr et al. |
| 6,263,965 B1 | 7/2001 | Schmidt et al. |
| 6,277,286 B1 | 8/2001 | Søntvedt et al. |
| 6,364,418 B1 | 4/2002 | Schwoebel |
| 6,399,030 B1 | 6/2002 | Nolan |
| 6,412,555 B1 | 7/2002 | Sten-Halvorsen et al. |
| 6,554,368 B2 | 4/2003 | Drake et al. |
| 6,569,235 B2 | 5/2003 | Carter, Jr. |
| 6,604,580 B2 | 8/2003 | Zupanick et al. |
| 6,631,761 B2 | 10/2003 | Yuan et al. |
| 6,679,326 B2 | 1/2004 | Zakiewicz |
| 6,758,289 B2 | 7/2004 | Kelley et al. |
| 6,767,518 B2 | 7/2004 | Ichikawa et al. |

| | | | |
|---|---|---|---|
| 6,796,381 | B2 | 9/2004 | Ayler et al. |
| 6,857,487 | B2 | 2/2005 | Galloway et al. |
| 6,869,147 | B2 | 3/2005 | Drake et al. |
| 6,880,633 | B2 | 4/2005 | Wellington et al. |
| 6,890,497 | B2 | 5/2005 | Rau et al. |
| 6,929,330 | B2 | 8/2005 | Drake et al. |
| 6,948,562 | B2 | 9/2005 | Wellington et al. |
| 6,997,256 | B2 | 2/2006 | Williams et al. |
| 7,066,254 | B2 | 6/2006 | Vinegar et al. |
| 7,066,973 | B1 | 6/2006 | Bentley |
| 7,097,255 | B2 | 8/2006 | Drake et al. |
| 7,128,375 | B2 | 10/2006 | Watson |
| 7,185,707 | B1 | 3/2007 | Graham |
| 7,192,092 | B2 | 3/2007 | Watson |
| 7,240,730 | B2 | 7/2007 | Williams et al. |
| 7,264,788 | B2 | 9/2007 | Hampden-Smith et al. |
| 7,381,320 | B2 | 6/2008 | Iqbal et al. |
| 7,428,926 | B2 | 9/2008 | Heins |
| 7,448,692 | B2 | 11/2008 | Drake et al. |
| 7,461,901 | B2 | 12/2008 | Drake et al. |
| 2002/0143693 | A1 | 10/2002 | Soestbergen et al. |
| 2003/0146002 | A1 | 8/2003 | Vinegar et al. |
| 2003/0188863 | A1 | 10/2003 | Gilbert et al. |
| 2004/0211559 | A1 | 10/2004 | Nguyen et al. |
| 2004/0249732 | A1 | 12/2004 | Drummond |
| 2005/0051362 | A1 | 3/2005 | McGuire et al. |
| 2006/0231455 | A1 | 10/2006 | Olsvik et al. |
| 2007/0039729 | A1 | 2/2007 | Watson |
| 2007/0044957 | A1 | 3/2007 | Watson |
| 2007/0181083 | A1 | 8/2007 | Fulton et al. |
| 2007/0237696 | A1 | 10/2007 | Payton |
| 2007/0277438 | A1 | 12/2007 | Lynch et al. |
| 2008/0017416 | A1 | 1/2008 | Watson et al. |
| 2008/0078552 | A1 | 4/2008 | Donnelly et al. |
| 2008/0087422 | A1 | 4/2008 | Kobler et al. |
| 2008/0122286 | A1 | 5/2008 | Brock et al. |
| 2008/0308174 | A1 | 12/2008 | Huglen |
| 2009/0084707 | A1 | 4/2009 | Gil |
| 2009/0100754 | A1 | 4/2009 | Gil |
| 2009/0139716 | A1 | 6/2009 | Brock et al. |
| 2009/0292571 | A1 | 11/2009 | Gil et al. |
| 2010/0058771 | A1 | 3/2010 | Gil et al. |
| 2010/0224370 | A1 | 9/2010 | Donnelly et al. |

FOREIGN PATENT DOCUMENTS

| | | |
|---|---|---|
| CA | 986544 | 3/1976 |
| CA | 1165712 | 4/1984 |
| CA | 1167238 | 5/1984 |
| CA | 1224911 | 8/1987 |
| CA | 2124199 | 6/1992 |
| CA | 2222668 | 5/1998 |
| CA | 2340506 | 9/2001 |
| CA | 2526854 | 9/2001 |
| CA | 2583508 | 9/2001 |
| CA | 2583513 | 9/2001 |
| CA | 2583519 | 9/2001 |
| CA | 2583523 | 9/2001 |
| CA | 2358805 | 10/2001 |
| CA | 2315596 | 2/2002 |
| CA | 2332207 | 2/2002 |
| EP | 0120625 | 10/1986 |
| JP | 03-267497 | 11/1991 |
| WO | WO 01/69042 | 9/2001 |
| WO | WO 2007/133461 | 11/2007 |
| WO | WO 2008/051822 | 5/2008 |
| WO | WO 2008/131169 | 10/2008 |
| WO | WO 2008/138118 | 11/2008 |

OTHER PUBLICATIONS

Huang, et al., "Wet Electric Heating for Starting Up SAGD/VAPEX", Alberta Research Council, Presented at the Petroleum Society's 5th Canadian International Petroleum Conference, Jun. 2004, pp. 1-12, Paper 2004-130, Petroleum Society: Canadian Institute of Mining, Metallurgy and Petroleum.

Hardy, "Feasibility Study for Underground Mining of Oil Sand", Department of Energy, Mines and Resources, Canada, Sep. 1977, pp. 1-314.

Harris, et al., "Feasibility of Underground Mining of Oil Sand", Alberta Oil Sands Information Center, 1978, pp. 1-33.

O'Rourke, et al., "AOSTRA's Underground Test Facility (UTF): Mine-Assisted Recovery Under Difficult Conditions", CIM Bulletin, Jan. 1989, pages unknown, vol. 82., No. 921.

Stephenson et al., "Mining Aspects of Hard to Access Oil Sands Deposits", Norwest Corporation, Mar. 2, 2006, pp. 1-57.

Deutsch et al., "Guide to SAGD (Steam Assisted Gravity Drainage) Reservoir Characterization Using Geostatistics", Centre for Computational Geostatistics (CCG) Guidebook Series vol. 3, 2005 (27 pages).

Author Unknown, "Technical Overview: Nigeria's Bitumen Belt and Developmental Potential", Ministry of Solid Minerals Development, Mar. 6, 2006, Available at http://64.233.167.104/search?q_cache:m12yiQ5o16EJ:msmd.gov.ng/privatisation/docs/Bitumen%2520Overview.pdf+SAGD+a..., printed Jan. 10, 2007, pp. 1-48.

Piper, et al., "An Evaluation of Heavy Oil Mining", Energy Development Consultants,, Inc. and Stone Webster Engineering Corp., Department of Energy Contract No. DE-AC03-80PC30259, Dec. 1982, pp. 1-270.

Hutchins, et al., "Mining for Petroleum: Feasibility Study", Energy Development Consultants, Inc., US Bureau of Mines Contract No. JO275002, Jul. 1978, pp. 1-365.

Author Unknown, "Future of Oil Recovery from Underground Drill Sites", Underground Technology Research Council, Committee of Mine Assisted Oil Recovery, Dec. 1988, pp. 1-51.

Fontaine, et al., "An Evaluation of Oil Mining in Ohio Phase II", Sep. 1983, pp. 1-58.

Fontaine, et al., "Recommeded Reservoir Engineering Testing Program for Oil Mining Projects", Jan. 1984, pp. 1-140.

Riddell, "Oil Mining a Review of Projects", Jun. 1984, pp. 1-32.

Hutchins, et al., "Oil Mining: An Emerging Technology", Wassum Mining Engineering, Dec. 1981, pp. 1-4.

Dick, et al., "Oil Mining", U.S. Bureau of Mines, 1980, pp. 1-6.

Dobson, et al., "Mining Technology Assists Oil Recovery from Wyoming Field", Journal of Petroleum Technology, from Soc. Pet Eng., Apr. 1981, pp. 1-7.

Author Unknown, "Oil Mining: The Fourth Order of Oil Recovery", Compressed Air Magazine, Dec. 1983, pp. 6-10.

Riddell, et al., "Heavy Oil Mining Technical and Economic Analysis", Presented at California Regional Meeting of the Society of Petroleum Engineers, Long Beach, CA Apr. 11-13, 1984, pp. 1-24.

Mikula et al., "Oil Sands Conditioning, Bitumen Release Mechanisms, and New Process Development", Alberta Oil Sands Information Services, 1999, pp. 1-8.

Mikula et al., "Commercial Implementation of a Dry Landscape Oil Sands Tailings Reclamation Option: Consolidated Tailings", Alberta Oil Sands Information Services; No. 1998.096, date unknown, pp. 907-921.

Czarnecki, Press Release; NSERC Industrial Research Chair in Oil Sands Syncrude Canada, Ltd, date unknown, pp. 1-3.

Canadian Heavy Oil Associate (CHOA) Annual Conference, Dec. 6, 2000, presentation by Oil Sands Underground Mining, Inc.

Corti, et al., "Athabasca Mineable Oil Sands: The RTR/Gulf Extraction Process Theoretical Model of Bitumen Detachment," The 4.sup.th UNITAR/UNDP International Conference on Heavy Crude and Tar Sands Proceedings, vol. 5, Edmonton, AB, Aug. 7-12, 1988, pp. 41-44, 71.

Author Unknown, "Underground Mining of Oil Sands," Oil Sands Underground Mining, Inc., presented at National Oil Sands Task Force, Jan. 2001 Quarterly Meeting, pp. 1-38.

Author Unknown, "A New Technology for the Recovery of Oil Sands," Oil Sands Underground Mining, Inc., presented at combined Oil Sands Task Force and Black Oil Pipeline Network Meeting, Jun. 2001, pp. 1-30.

Oil Sands Underground Mining, Inc., "A Private Sector Approach to Design/Build," presented at NAT 2002, 34 pages.

Drake, et al., "A Promising New Concept for Underground Mining of Oil Sands," technical papers presented to Canadian Institute of Mining (CIM), Ft. McMurray, Jun. 13-15, 2001, pp. 1-16.

Drake, "An Innovative Approach for the Underground Mining of Oil Sands," presented at North American Tunneling 2002, Seattle, WA May 2002 and NARMS-TAC 202, Mining and Tunneling Innovation and Opportunity Conference, Toronto, Ontario, Jul. 2002, pp. 1-8.

Butler, "Thermal Recovery of Oil and Bitumen", 2nd Printing by GravDrain, Inc., Calgary, Alberta,1998, Parts 1-8, pp. 1-548.

Li, et al., "Prediction of Oil Production by Gravity Drainage", Stanford University, SPE 84 184, Oct. 2003, pp. 1-8.

"Plan of Operation, Shell Frontier Oil and Gas Inc., E-ICP Test Project", Oil Shale Research and Development Project, Prepared for Bureau of Land Management, Feb. 15, 2006, pp. 1-70.

Sahni, et al., "Electromagnetic Heating Methods for Heavy Oil Reservoirs", Submitted to 2000 Society of Petroleum Engineers, SPE/AAPG Western Regional Meeting, May 1, 2000, Long Beach, CA, pp. 1-12.

"Vektron® 6913 $No_x$ Reduction Strategy Implementation Options," Infineum International Ltd., 2000, online: US EPA http://.wwww.epa.gov.otaq.regs/fuels/additive/i-b-03b.pdf.

Haefeli et al., "Carbon Dioxide Capture and Storage Issues—Accounting and Baselines Under the United Nations Framework Convention on Climate Change (UNFCCC)," International Energy Agency, Paris, May 2004.

"Carbon Sequestration Atlas of the United States and Canada", U.S. Department of Energy, Office of Fossil Energy, National Energy Technology Laboratory, Mar. 2007, available at http://www.netl.doe.gov/technologies/carbon_seq/refshelf/atlas/ATLAS.pdf, pp. 1-90.

"Liquefied Petroleum Gas" and "Natural Gas", Handbook of Fuels, 2008, Wiley-VCH Verlag GmbH & Co. KgaA, edited by Barbara Elvers, pp. 140-141 and 152-154.

Gallucci, et al., "SEM Analysis Application to Study CO2 Capture by Means of Dolomite", Open-Access Journal for the Basic Principles of Diffusion Theory, Experiment and Application, 2007, available at http://www.uni-leipzig.de/diffusion/journal/pdf/volume7/diff_fund_7(2007)5.pdf, pp. 1-11.

International Search Report for International (PCT) Application No. PCT/IB2009/005087, mailed Jul. 21, 2009.

Written Opinion for International (PCT) Application No. PCT/IB2009/005087, mailed Jul. 21, 2009.

Schmidt, "What's new in production", World Oil, Oct. 2006, vol. 227, No. 10, p. 14, available at http://web.ebscohost.com.proxy.bib.uottawa.ca/ehost/delivery?vid=4&hid=105&sid=3ab.., accessed Jul. 16, 2009, pp. 1-3.

Official Action for Canadian Patent Application No. 2,713,536, mailed Feb. 3, 2012.

METHOD OF CONTROLLING A RECOVERY AND UPGRADING OPERATION IN A RESERVOIR

CROSS REFERENCE TO RELATED APPLICATION

The present application claims the benefits, under 35 U.S.C.§119(e), of U.S. Provisional Application Ser. No. 61/026,594 filed Feb. 6, 2008, entitled "Method of Controlling a Thermal Recovery and Upgrading Operation in a Reservoir" to Gil and Ser. No. 61/030,817 filed Feb. 22, 2008, entitled "Method of Controlling a Thermal Recovery and Upgrading Operation in a Reservoir" to Gil, both of which are incorporated herein by these references.

FIELD

The present invention relates generally to a method and means of generating a range of petroleum products from bitumen or heavy oil reservoir and specifically to the in situ generation of the products from bitumen or heavy oil.

BACKGROUND

Oil is a nonrenewable natural resource having great importance to the industrialized world. The increased demand for and decreasing supplies of conventional oil has led to the development of alternate sources of oil such as deposits of bitumen and heavy crude as well as a search for more efficient methods for recovery and processing from such hydrocarbon deposits.

There are substantial deposits of oil sands in the world with particularly large deposits in Canada and Venezuela. For example, the Athabasca oil sands region of the Western Canadian Sedimentary Basin contains an estimated 1.3 trillion bbls of potentially recoverable bitumen. An equally large deposit of bitumen may also be found in the Carbonates of Alberta. There are lesser, but significant deposits, found in the U.S. and other countries. These oil sands and carbonate reservoirs contain a petroleum substance called bitumen or heavy oil. Bitumen deposits cannot be economically exploited by traditional oil well technology because the bitumen or heavy oil is too viscous to flow at natural reservoir temperatures.

When oil sand deposits are near the surface, they can be economically recovered by surface mining methods. For example, surface mining of shallower deposits in the Alberta oil sands is currently accomplished by large power shovels and trucks to feed a primary bitumen extraction facility, which, in turn, feeds an upgrader facility where it is refined and converted into crude oil and other petroleum products.

When oil sand deposits are too far below the surface for economic recovery by surface mining, bitumen can be economically recovered in many, but not all, areas by recently developed in-situ recovery methods, such as Steam Assisted Gravity Drain ("SAGD") or other variants, and combinations of gravity drain technology, such as Heat Assisted Gravity Drain ("HAGD") and VAPEX, which can mobilize the bitumen or heavy oil. The principal method currently being implemented on a large scale is Steam Assisted Gravity Drain ("SAGD"). Typically, SAGD wells or well pairs are drilled from the earth's surface down to the bottom of the oil sand deposit and then horizontally along the bottom of the deposit. The wells or well pairs are then used to inject steam and collect mobilized bitumen.

Horizontal and/or vertical wells may also be installed and operated from an underground workspace, such as described for example in U.S. patent application Ser. No. 11/441,929 (US Patent Application Publication Number 2007-0044957), entitled "Method for Underground Recovery of Hydrocarbons", and U.S. patent application Ser. No. 11/737,578 (US Patent Application Publication Number 2008-0017416), entitled "Method of Drilling from a Shaft", which are incorporated herein by reference. These horizontal and/or vertical wells may also be operated as HAGD wells, such as described, for example, in U.S. patent application Ser. No. 12/327,547 (US Patent Application Publication Number 2009-0139716), entitled "Method of Recovering Bitumen from Tunnel and Shaft with Electrodes, Heating Elements and Recovery Wells", which is incorporated herein by reference.

HAGD is a relatively new process for mobilizing bitumen in the Alberta oil sands or carbonates. Electric heater elements are embedded in the reservoir material and used, in place of steam, to heat the formation until the bitumen becomes fluid enough to flow by gravity drainage. HAGD may require more energy than SAGD but may be used in reservoirs where SAGD cannot such, as for example, reservoirs with poor steam caps. HAGD and SAGD may also be used in combination where HAGD elements are used to melt the bitumen around the steam injectors, which allows the steam chamber to form more quickly. An exemplary means of producing bitumen or heavy oil is described in U.S. Pat. No. 7,066,254 to Vinegar, et al. entitled "In Situ Thermal Processing of a Tar Sands Formation", which is incorporated herein by reference.

In most thermal recovery operations, 6 to 10 API bitumen is the principal petroleum product recovered. Typically, this bitumen must be de-sulfurized and upgraded to about to about 32 to 36 API to produce a marketable low sulfur crude comparable to West Texas intermediate.

Even the most efficient SAGD or HAGD operation requires substantial amounts of energy to deliver the required amount of steam or heat to the reservoir to mobilize the bitumen. If this energy is obtained by burning fossil fuels, there is the potential to generate significant amounts of carbon dioxide emissions during recovery operations. In an exemplary SAGD operation having an average Steam-Oil-Ratio ("SOR") of 3, the energy required to produce high quality steam to recover 1 barrel of heavy oil or bitumen oil is equivalent to about ¼ of a barrel of oil (the SOR is determined by the number of barrels of water required to produce the steam divided by the number of barrels of oil or bitumen recovered). Thus, oil produced by thermal recovery methods has the potential to generate 25% or more carbon dioxide emissions than oil recovered by pumping from conventional oil wells.

In addition, the upgrading process when carried out underground, such as described for example in U.S. Pat. No. 7,066,254 or at a surface refinery can generate additional carbon dioxide and other unwanted emissions.

Because of global warming concerns, this potential for substantially increasing carbon dioxide emissions may outweigh the economic and other advantages of producing the enormous reserves of unconventional hydrocarbon deposits available.

There remains, therefore, a need for a method for a controllable recovery process that can accomplish a significant amount of in-situ upgrading of bitumen after it has been mobilized within the producing reservoir, and this need includes a method that substantially reduces or eliminates unwanted emissions, principally carbon dioxide emissions.

SUMMARY

These and other needs are addressed by the present invention. The various embodiments and configurations of the present invention are directed generally to a controlled application of reservoir temporal and spatial temperature profiles not only to recover hydrocarbons but also to convert in situ hydrocarbons into a number of desirable products, such as asphaltenes, jet fuel, diesel fuel, and heavy vacuum gas oil.

In a first embodiment, a method includes the steps:

(a) providing a plurality of mobilizing wells for mobilizing hydrocarbons and a plurality of recovery wells to recover mobilized hydrocarbons, the mobilizing and recovery wells defining a portion of an underground deposit, the defined portion comprising solid, liquid and gaseous hydrocarbons, wherein at least some of the mobilizing wells and/or recovery wells extend from an underground manned excavation;

(b) for a selected time interval, mobilizing, by the mobilizing wells, hydrocarbons from the defined portion while removing hydrocarbons from the defined portion, wherein, during mobilization, the defined portion is at a first temperature of no more than about 350° C.;

(c) after a selected time interval, heating a first zone of the defined portion of the deposit to a temperature above 350° C. and sufficient to convert at least a portion of the remaining solid and/or liquid hydrocarbons into at least one of asphaltenes, jet fuel, diesel fuel, and heavy vacuum gas oil; and (d) removing the at least one of asphaltenes, jet fuel, diesel fuel, heavy vacuum gas oil and gaseous hydrocarbons from the underground deposit.

In a second embodiment, a method includes the steps:

(a) providing a plurality of mobilizing wells comprising at least one of steam injectors, diluent injectors, and heating elements for mobilizing and mobilizing hydrocarbons, a plurality of heating wells to thermally heat and crack hydrocarbons into desired products, and a plurality of recovery wells to recover mobilized hydrocarbons and products derived therefrom, the mobilizing, heating, and recovery wells being positioned in a selected portion of an underground deposit, the selected portion comprising liquid and gaseous hydrocarbons, wherein at least some of the mobilizing wells, heating wells, and/or recovery wells extend from an underground manned excavation;

(b) for a selected time interval, mobilizing, by the plurality of mobilizing wells, hydrocarbons in the selected portion and removing hydrocarbons from the selected portion, wherein the selected portion is at a first temperature of no more than about 350° C.;

(c) after a selected amount of hydrocarbons are removed from the selected portion, heating, by the heating wells, a first zone of the selected portion of the deposit to a temperature above 350° C. and sufficient to convert at least a portion of the liquid hydrocarbons remaining in the selected portion into at least one of asphaltenes, jet fuel, diesel fuel, and heavy vacuum gas oil; and (d) removing the at least one of asphaltenes, jet fuel, diesel fuel, and heavy vacuum gas oil from the selected portion of the underground deposit.

In a third embodiment, a system includes:

mobilizing well means for mobilizing, for a selected time interval, a selected portion of an underground hydrocarbon-containing deposit to a first temperature of no more than about 350° C.;

recovery well means for removing a selected amount of hydrocarbons from the selected portion; and heating well means for heating a first zone of the selected portion of the deposit to a temperature above 350° C. and sufficient to convert at least a portion of the liquid hydrocarbons remaining in the selected portion into asphaltenes, at least one of jet fuel and diesel fuel, and heavy vacuum gas oil, wherein the recovery well means removes the asphaltenes, at least one of jet fuel and diesel fuel, and heavy vacuum gas oil from the selected portion of the underground deposit and wherein at least some of the mobilizing well means and/or recovery well means extend from an underground manned excavation.

The recovery processes of the above embodiments, when operated in a preferred manner, emit no significant carbon dioxide during thermal recovery and upgrading phases of operations. Control is accomplished by installing wells for various functions from a combination of surface and underground well-head platforms. Any recovery process and system can use a combination of reservoir recovery and heating techniques based on various injector and/or heating apparatuses installed by wells into the reservoir from underground; product production wells installed from underground or from the surface; diluent and/or steam injection wells installed from underground or from the surface; gas disposal injection wells installed from underground or from the surface; gas scavenging and collection vacuum wells installed from the surface; carbon dioxide EOR injection wells installed from the surface; and water disposal wells installed from underground or from the surface. This arrangement of wells installed from the surface and underground can allow thermal control of various zones of the reservoir so that various petroleum products can be recovered directly from the reservoir. In addition, surface or underground facilities can be provided that treat recovered water; prepare and segregate various petroleum products, capture emissions especially carbon dioxide; and generate power for heating elements and steam generation with excess power being available to be sold. Thus, by effective use of surface and underground facilities, a bitumen reservoir may be operated as a recovery and partial upgrading facility, thereby substantially reducing energy expenditures and eliminating unnecessary emissions, especially carbon dioxide.

In one configuration, suitable for smaller operations, a gas turbine power plant and/or a steam power plant are used to generate electrical power and energy. In another configuration, suitable for larger operations a nuclear reactor is used to generate electrical power and energy.

The following definitions are used herein:

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

A heating well as used herein is a well containing any type of heating elements or is a well capable of steam injection. That is, a heating well is any well used in thermally mobilizing an immobile hydrocarbons such, as for example, bitumen or heavy oil.

Kerogen is a mixture of organic chemical compounds that make up a portion of the organic matter in sedimentary rocks such as oil shales. When heated to the right temperatures, some types of kerogen release oil or gas.

A mobilized hydrocarbon is a hydrocarbon that has been made flowable by some means. For example, some heavy oils and bitumen may be mobilized by heating them and/or mixing them with a diluent to reduce their viscosities and allow them to flow under the prevailing drive pressure. Most liquid hydrocarbons may be mobilized by increasing the drive pressure on them, for example by water or gas floods, so that they can overcome interfacial and/or surface tensions and begin to flow.

A mobilizing well as used herein is a well whose function is to cause bitumen, heavy oil or another hydrocarbon which does not readily flow, to be mobilized and able to flow to a recovery well. A well containing heating elements is an example of a mobilizing well. A well from which steam and/or diluent may be injected into a producing formation is another example of a mobilizing well. A well that can be used to operate a combination of heating elements, steam and diluent injection either simultaneously or at different times is, in general, defined herein as a mobilizing well. A heating well is a mobilizing well. A well for injecting diluent into a reservoir is no a heating well but is a mobilizing well since the diluent injection is a cold or non-thermal process. A mobilizing well may also be converted to a recovery well.

Primary production or recovery is the first stage of hydrocarbon production, in which natural reservoir energy, such as gasdrive, waterdrive or gravity drainage, displaces hydrocarbons from the reservoir, into the wellbore and up to surface. Production using an artificial lift system, such as a rod pump, an electrical submersible pump or a gas-lift installation is considered primary recovery. Secondary production or recovery methods frequently involve an artificial-lift system and/or reservoir injection for pressure maintenance. The purpose of secondary recovery is to maintain reservoir pressure and to displace hydrocarbons toward the wellbore. Tertiary production or recovery is the third stage of hydrocarbon production during which sophisticated techniques that alter the original properties of the oil are used. Enhanced oil recovery can begin after a secondary recovery process or at any time during the productive life of an oil reservoir. Its purpose is not only to restore formation pressure, but also to improve oil displacement or fluid flow in the reservoir. The three major types of enhanced oil recovery operations are chemical flooding, miscible displacement and thermal recovery.

A recovery well is a well from which a mobilized hydrocarbon such, as for example, bitumen or heavy oil may be recovered.

A shaft is a long approximately vertical underground opening commonly having a circular cross-section that is large enough for personnel and/or large equipment. A shaft typically connects one underground level with another underground level or the ground surface.

A tunnel is a long approximately horizontal underground opening having a circular, elliptical or horseshoe-shaped cross-section that is large enough for personnel and/or vehicles. A tunnel typically connects one underground location with another.

An underground workspace as used in the present invention is any excavated opening that is effectively sealed from the formation pressure and/or fluids and has a connection to at least one entry point to the ground surface.

A well is a long underground opening commonly having a circular cross-section that is typically not large enough for personnel and/or vehicles and is commonly used to collect and transport liquids, gases or slurries from a ground formation to an accessible location and to inject liquids, gases or slurries into a ground formation from an accessible location.

Well drilling is the activity of collaring and drilling a well to a desired length or depth.

Well completion refers to any activity or operation that is used to place the drilled well in condition for production. Well completion, for example, includes the activities of open-hole well logging, casing, cementing the casing, cased hole logging, perforating the casing, measuring shut-in pressures and production rates, gas or hydraulic fracturing and other well and well bore treatments and any other commonly applied techniques to prepare a well for production.

It is to be understood that a reference to diluent herein is intended to include solvents.

It is to be understood that a reference to oil herein is intended to include low API hydrocarbons such as bitumen (API less than ~10°) and heavy crude oils (API from ~10° to ~20°) as well as higher API hydrocarbons such as medium crude oils (API from ~20° to ~35°) and light crude oils (API higher than ~35°). A reference to bitumen is also taken to mean a reference to low API heavy oils.

DETAILED DESCRIPTION

Mobilizing hydrocarbons such as bitumen or heavy oil, for example from oil sands, may be accomplished using steam to heat the bitumen or heavy oil, or by injecting diluents to increase the API rating of the bitumen or heavy oil, or by a combination of steam and diluents. Other heating methods besides steam may also be used. These include, for example:
- electrodes for AC or DC ohmic heating of the reservoir material between adjacent electrodes;
- thermal conduction heaters that heat the surrounding reservoir material by thermal conduction;
- electrodes for inductive heating of the surrounding reservoir material;
- high frequency RF, including microwave, heating of the surrounding reservoir material in which the heating element is typically called an RF antenna.

Where any of these heating methods (besides steam) may be used, they are referred to herein generally as heating elements. When a specific type of heating method is intended, it will be referred to by its specific name (ie ohmic electrode, thermal conduction heater, induction electrode, RF antenna).

A heating well as used herein is a well containing any of the heating elements described above or is a well capable of steam injection.

A mobilizing well as used herein is a well whose function is to cause bitumen, heavy oil or another hydrocarbon, which does not readily flow, to be mobilized and able to flow to a recovery well. A heating well which contains heating elements is an example of a mobilizing well. A well from which steam or diluent may be injected into a producing formation is another example of a mobilizing well. A well that can be used to operate a combination of heating elements, steam and diluent injection either simultaneously or at different times is, in general, defined herein as a mobilizing well. A mobilizing well may also be converted to a recovery well.

A recovery well as used herein is a well from which a mobilized hydrocarbon such, as for example, bitumen or heavy oil may be recovered.

Figure 1:
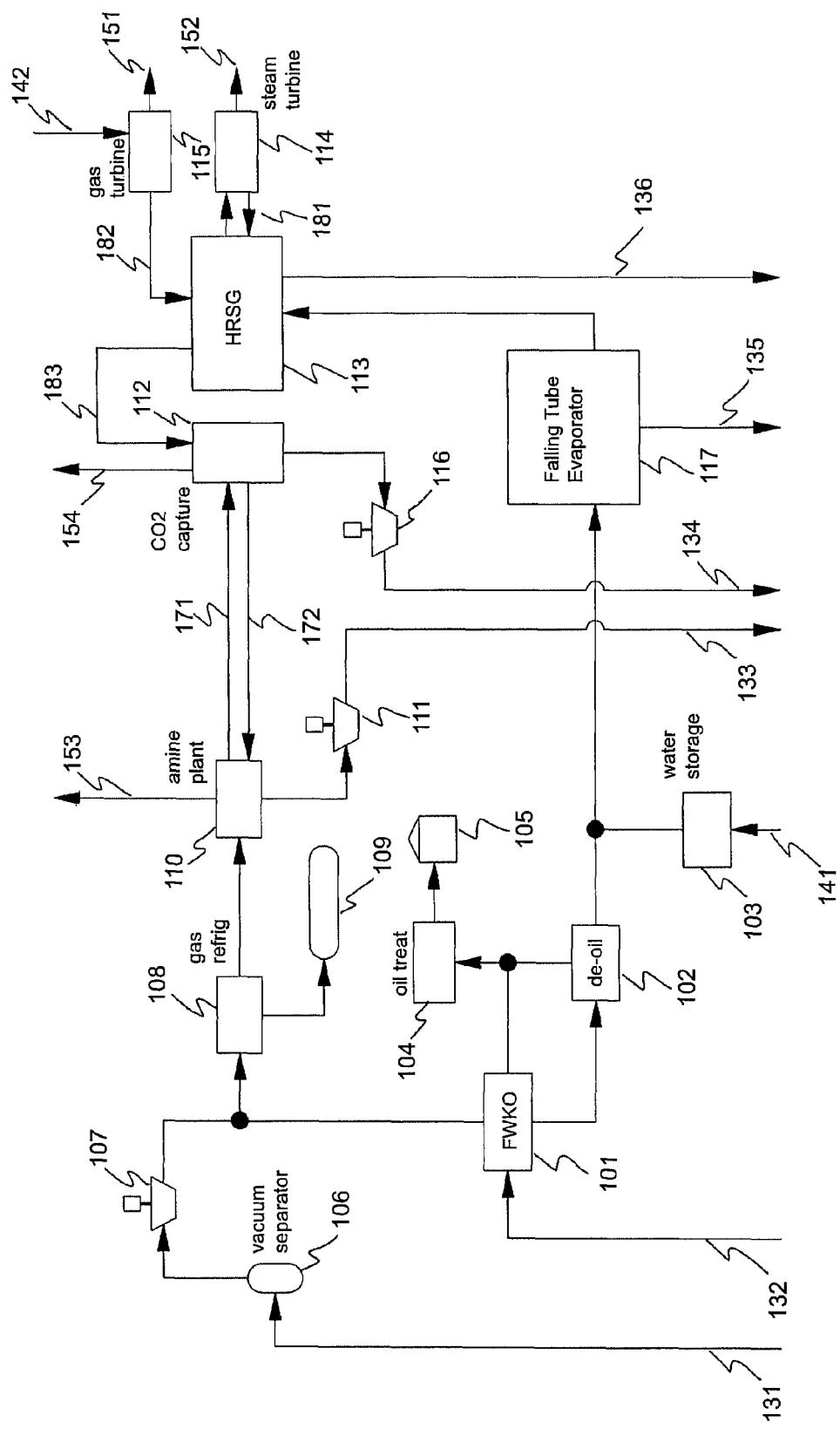
FIG. 1 is a schematic of the overall flow process of the present invention with a combustion-powered steam plant.

FIG. 1 is a schematic of the overall flow process of the present invention with a combustion-powered steam plant. The main production is extracted from production wells 132 and delivered to a Free Water Knock-Out ("FWKO") unit 101 where most of the water is separated from most of the liquid and gaseous hydrocarbons. Water is sent from the FWKO 101 to a de-oiling apparatus 102. The liquid hydrocarbon from the FWKO 101 is sent to oil-treating apparatus 104 where it is prepared for storage in oil storage tank 105. The gaseous hydrocarbons from the FWKO 101 are added to other hydrocarbon gases collected from the reservoir via gas wells 131 and the combined gases are sent to a natural gas refrigeration plant 108. Water from the de-oiling apparatus 102 is combined with make-up water from a make-up water source such as for example water well 141 supplying make-up water to storage apparatus 103. Most of the water from de-oiling apparatus 102 and make-up water storage 103 is delivered to a Falling Tube Evaporator apparatus 117. The Falling Tube Evaporator apparatus 117 removes most of the impurities from the water and delivers suitably clean water appropriate for a boiler for Heat Recovery Steam Generator ("HRSG") 113. Most of the residual impure water from the Falling Tube Evaporator apparatus 117 is sent to a water disposal well 135. It is understood that reference to a Falling Tube Evaporator may also mean a Rising Tube Evaporator since both a Rising Tube and Falling Tube Evaporator accomplish the same function in process of the present invention.

Hydrocarbon and other gases are extracted from gas scavenging wells 131 and delivered to a vacuum separator unit 106 and then compressed by compressor 107. These gases are added to other hydrocarbon gases from the FWKO 101 and sent to a Gas Refrigeration Plant 108. The temperature of Gas Refrigeration Plant 108 is kept above the boiling point of hydrogen sulphide so that only the Natural Gas Liquids ("NGLs") remain as liquids. This process produces NGL products which are stored in a tank 109 for delivery as products or use in other on-site activities. The NGL products are typically propane $C_3H_8$, n-butane $C_4H_{10}$ and n-pentane $C_5H_{12}$. The Gas Refrigeration Plant 108 separates out most of the other gases such as, for example, methane $CH_4$, ethane $C_2H_6$, carbon monoxide (CO), carbon dioxide ($CO_2$), hydrogen sulphide ($H_2S$) and various oxides of nitrogen ("NOxs") and sends these gases to an Amine Plant 110. The Amine Plant 110 removes most of the carbon dioxide ($CO_2$) and hydrogen sulphide ($H_2S$) and sends them to compressor 111 to be compressed and injected into gas disposal wells 133. Valuable and useful gases such as methane $CH_4$ and ethane $C_2H_6$ are collected via path 153 and used for other purposes such as fuels for a combustion gas turbine 115. As is well-known, aqueous monoethanolamine (MEA), diglycolamine (DGA), diethanolamine (DEA), diisopropanolamine (DIPA) and methyldiethanolamine (MDEA) are widely used for removing most of the carbon dioxide ($CO_2$) and hydrogen sulphide ($H_2S$) from natural gas streams and refinery process streams. They may also be used to remove most of the $CO_2$ from combustion gases or flue gases.

Electrical power for the facility is provided by a combustion gas turbine 115 via path 151 and a steam turbine 114 via path 152. As can be appreciated, these can be separate power plants. In FIG. 1, they are shown as a Combined Cycle Power Plant. The combustion turbine 115 uses fuel and air provided via path 142 where the fuel may be from the Amine Plant via path 153 or from an external natural gas source or from a combination of both sources. The hot exhaust gases from the combustion turbine 115 are sent via path 182 to the HRSG 113 to provide some of the heat via an internal heat exchange system to generate steam. These gas turbine exhaust gases are then sent from the HRSG 113 via path 183 to $CO_2$ capture apparatus 112. Some of the steam generated in HRSG 113 is used to provide steam to power steam turbine 114. Most of the steam generated in HRSG 113 is sent to steam injection wells 136 where it is used in mobilizing bitumen; maintaining desired reservoir temperature; and assisting reservoir heating elements (not shown here) to raise reservoir temperature when partial upgrading is desired.

As described above, carbon dioxide and other combustion products generated in combustion turbine 115 are sent to a $CO_2$ capture apparatus 112. The $CO_2$ capture apparatus 112 may use a number of methods for capturing most of the $CO_2$. The flue gases may be treated to remove particulate matter, NOxs, capture sulphur and $CO_2$. An electrostatic precipitator process may be used to clean-up most of the particulate matter. A catalytic converter process may be used for removing most of the NOxs. Most of the sulphur may be removed by injecting, for example, limestone ($CaCO_4$) and used to capture most of the $SO_x$ as gypsum ($CaSO_4$) which is a saleable product. Most of the carbon dioxide may be removed and captured from the remaining flue gases by a membrane apparatus or other known processes. Some of the $CO_2$ is captured and compressed by compressor 116 and may be sent back into the reservoir for Enhanced Oil Recovery ("EOR") purposes via EOR injector wells 134. Nitrogen is emitted by the $CO_2$ capture apparatus 112 via path 154. Amine from Amine Plant 110 is also sent via path 171 to the $CO_2$ capture apparatus 112 where it recovers some $CO_2$. This $CO_2$-rich amine is then returned to Amine Plant 110 via path 172 where most of the carbon dioxide, any hydrogen sulphide and NOXs are removed and sent to compressor 111 to be compressed and injected into gas disposal wells 133.

An operation in the range of approximately 5,000 to 50,000 barrels per day ("bpd") of bitumen processing is suitable for such a combustion-powered and steam plant embodiment. The power plant would typically be 120 MW for a 10,000 bpd operation. In a typical 10,000 bpd bitumen recovery operation with a Gas to Oil Ratio ("GOR") of 2, an estimated 100 thousand standard cubic feet ("Mscf") of gas may be recovered. This divides typically into about 80% methane and about 20% carbon dioxide.

Figure 2:
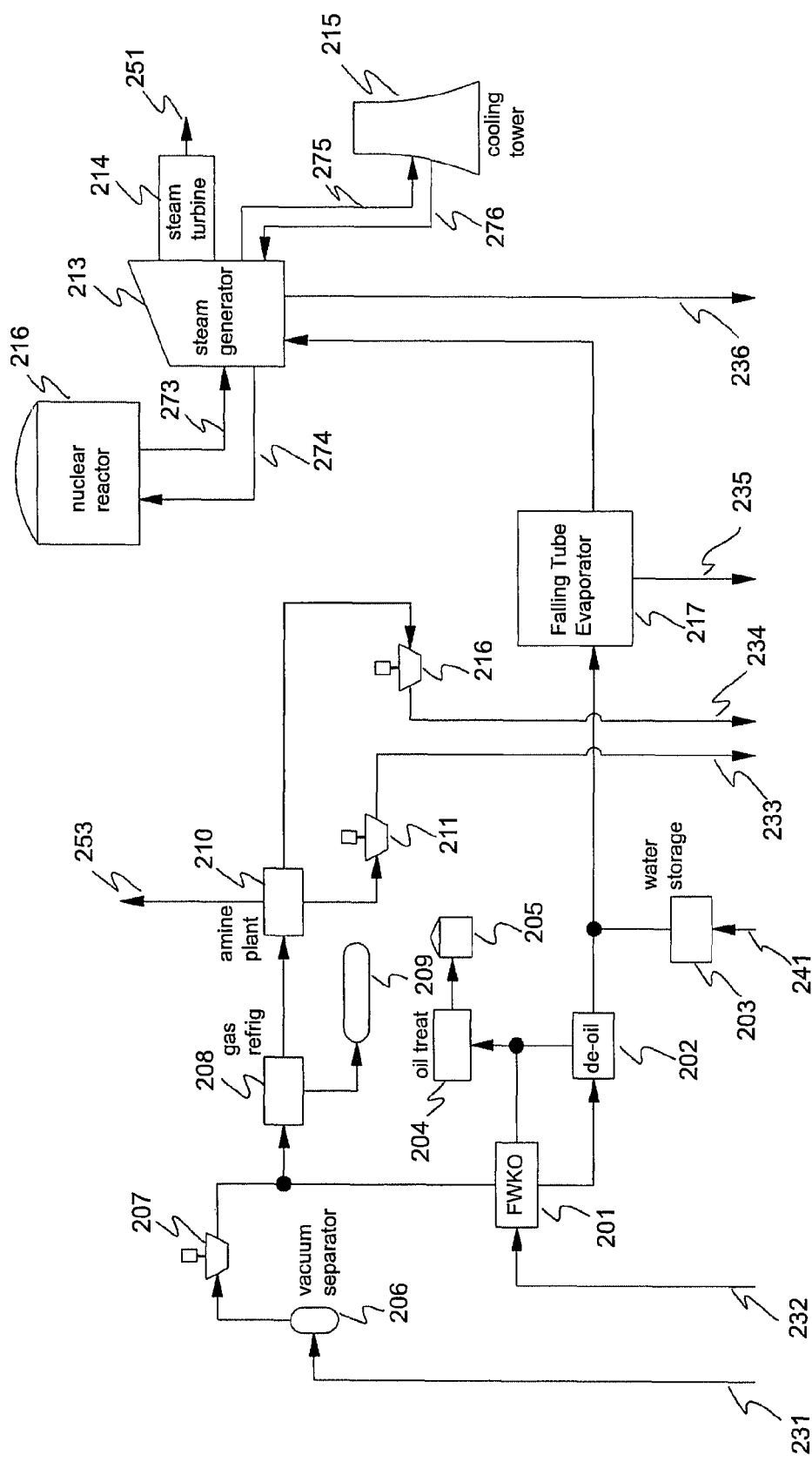
FIG. 2 is a schematic of the overall flow process of the present invention with a nuclear-powered steam plant.

FIG. 2 is a schematic of the overall flow process of the present invention with a nuclear-powered steam plant. The main production is extracted from production wells 232 and delivered to a Free Water Knock-Out ("FWKO") unit 201 where most of the water is separated from most of the liquid and gaseous hydrocarbons. Water is sent from the FWKO 201 to a de-oiling apparatus 202. The liquid hydrocarbon from the FWKO 201 is sent to oil-treating apparatus 204 where it is prepared for storage in oil storage tank 205. The gaseous hydrocarbons from the FWKO 201 are added to other hydrocarbon gases collected from the reservoir via gas wells 231 and the combined gases are sent to a natural gas refrigeration plant 208. Water from the de-oiling apparatus 202 is combined with make-up water from a make-up water source such as for example water well 241 supplying make-up water to storage apparatus 203. The water from de-oiling apparatus 202 and make-up water storage 203 is delivered to a Falling Tube Evaporator apparatus 217. The Falling Tube Evaporator apparatus 217 removes most of the impurities from the water and delivers suitably clean water appropriate for a boiler for Nuclear powered steam generator 213. Most of the residual impure water from the Falling Tube Evaporator apparatus 217 is sent to a water disposal well 235.

Hydrocarbon and other gases are extracted from gas scavenging and production wells 232 and delivered to a vacuum separator unit 206 and then compressed by compressor 207. These gases are added to other hydrocarbon gases from the FWKO 201 and sent to a Gas Refrigeration Plant 208. The temperature of Gas Refrigeration Plant 208 is kept above the boiling point of hydrogen sulphide so that only the Natural Gas Liquids ("NGLs") remain as liquids. This process produces NGL products which are stored in a tank 209 for delivery as products or use in other on-site activities. The NGL products are typically propane $C_3H_8$, n-butane $C_4H_{10}$ and n-pentane $C_5H_{12}$. The Gas Refrigeration Plant 208 separates out most of the other gases such as, for example, methane $CH_4$, ethane $C_2H_6$, carbon monoxide (CO), carbon dioxide ($CO_2$), hydrogen sulphide ($H_2S$) and NOXs and sends these gases to an Amine Plant 210. The Amine Plant 210 removes most of the carbon dioxide ($CO_2$) and hydrogen sulphide ($H_2S$). Valuable and useful gases such as methane $CH_4$ and ethane $C_2H_6$ are collected via path 253 and used for other purposes such as fuels for auxiliary plant facilities or sold to a pipeline. Some of the $CO_2$ recovered from Amine Plant 210 is captured and compressed by compressor 216 and may be sent back into the reservoir for Enhanced Oil Recovery ("EOR") purposes via EOR injector wells 234. Most of the remaining carbon dioxide, any hydrogen sulphide and NOXs recovered from Amine Plant 210 are removed and sent to compressor 211 to be compressed and injected into gas disposal wells 233.

Electrical power for the facility is provided via path 251 by a nuclear power plant comprised of a nuclear reactor 216, a heat exchange and steam generation facility 213 and a steam turbine 214. Some of the steam generated in heat exchange and steam generation facility 213 is used to provide steam to power steam turbine 214. Most of the steam generated in heat exchange and steam generation facility 213 is sent to steam injection wells 236 where it is used in mobilizing bitumen; maintaining desired reservoir temperature; and assisting reservoir heating elements (not shown here) to raise reservoir temperature when partial upgrading is desired.

Cool water in heat exchange and steam generation facility 213 is sent via path 274 to nuclear reactor 216 where it is heated and returned via path 273 to heat exchange and steam generation facility 213 where it is used to generate steam for powering steam turbine 214. Most of the excess heat from this steam is removed by sending the steam via path 275 to, for example, a cooling tower 215. Most of the cooled steam or water is then returned to via path 276 to heat exchange and steam generation facility 213.

An operation in the range of approximately 50,000 to 200,000 barrels per day ("bpd") of bitumen processing is suitable for such a nuclear-powered steam plant embodiment. The power plant would typically be 1,200 MW for a 100,000 bpd operation. In a typical 100,000 bpd bitumen recovery operation with a Gas to Oil Ratio ("GOR") of 2, an estimated 1 million standard cubic feet ("Mscf") of gas may be recovered. This divides typically into about 80% methane and about 20% carbon dioxide.

Figure 3:
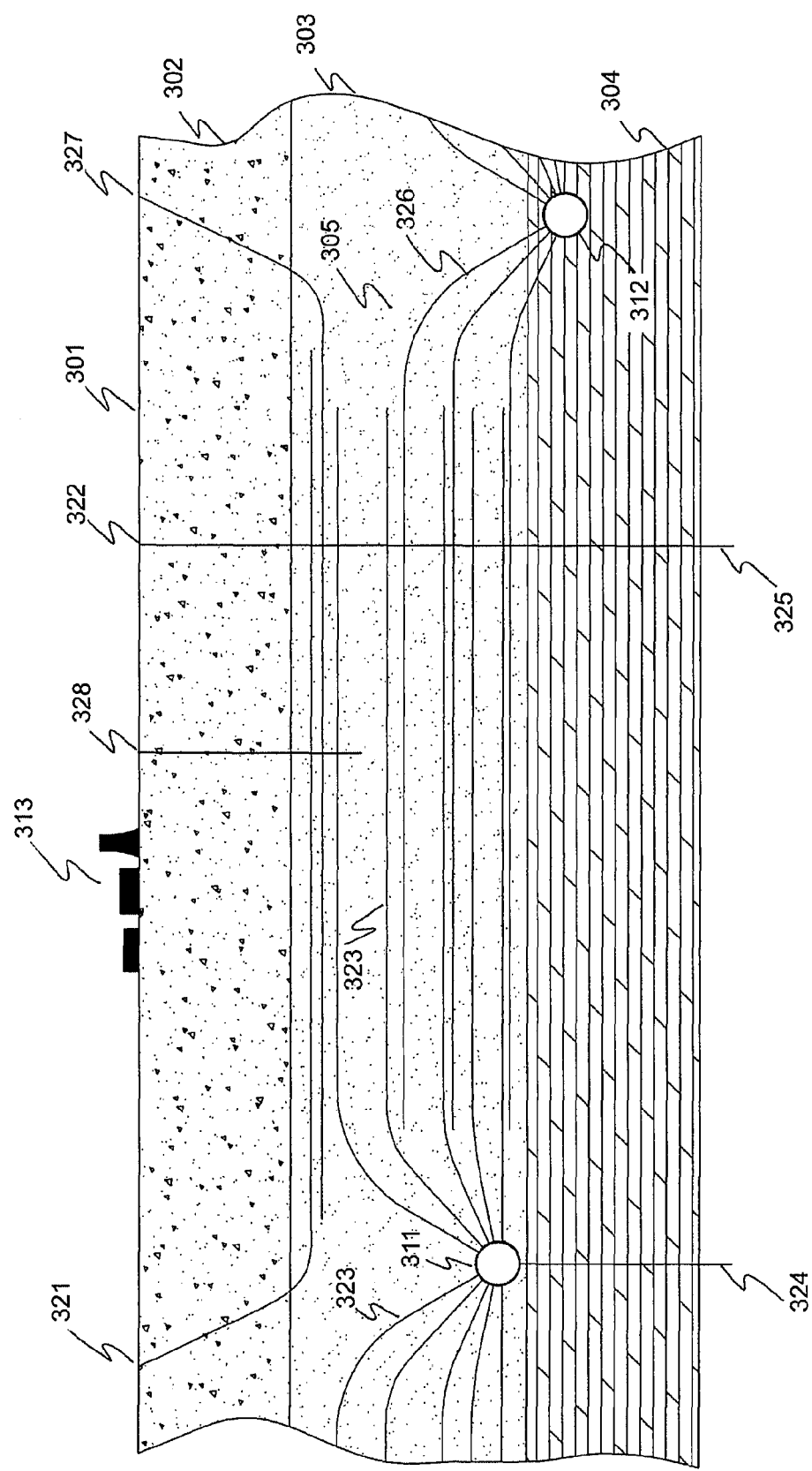
FIG. 3 is a schematic side view of a possible well placement for the present invention.

FIG. 3 is a schematic side view of an example of well placement for the present invention. As can be seen from the descriptions of FIG. 1 or 2, a complex hydrocarbon recovery and partial upgrading facility can involve several different types of wells. These are combinations of:

reservoir heating elements placed into the reservoir from wells installed from underground;
hydrocarbon production wells installed from underground and/or from the surface;
steam injection wells installed from underground and/or from the surface;
gas scavenging and gas production wells installed from the surface;
water disposal wells installed from underground and/or from the surface;
unwanted-gas disposal wells installed from underground and/or from the surface;
carbon dioxide EOR injection wells installed from the surface.

FIG. 3 shows a bitumen or heavy oil reservoir 303 overlain by overburden formations 302 and having a basement formation 304. Many of the wells can be installed and facilities built on the surface 301. Many of the wells can also be installed and other facilities can also be located underground in tunnels as described in U.S. patent application Ser. No. 11/441,929 filed May 25, 2006, entitled "Method for Underground Recovery of Hydrocarbons" which is incorporated herein by this reference, or shafts as described for example in U.S. patent application Ser. No. 11/737,578 filed Apr. 19, 2007 entitled "Method of Drilling from a Shaft" which is also incorporated herein by this reference. Some tunnels 311 may be located in the reservoir 303 while other may be located in the basement formation 304. Tunnels (not shown) may also be located above the reservoir 304 in the overburden 302. Shafts connecting the tunnels to the surface 301 are not shown. These may be main shafts for bringing in men, materials and machines; ventilation shafts; and utility shafts used as conduits for produced hydrocarbons, steam, gas disposal, water disposal and the like. As an example, tunnel 312 may be used to install horizontal wells 326 that contain heating elements that would be used to provide heating of the reservoir, especially the lower half of the reservoir. Examples of these might be various heating elements such as described in U.S. patent application Ser. No. 12/327,547 filed Dec. 3, 2008 entitled "Method of Recovering Bitumen from Tunnel and Shaft with Electrodes, Heating Elements and Recovery Wells" which is incorporated herein by this reference. Horizontal wells 326 may be closely spaced with service well-heads located in tunnel 312. Tunnel 311 may be used to install horizontal wells 323 that may be single wells or well pairs for steam injection into the reservoir 305 and to install production wells to collect mobilized heavy hydrocarbons from gravity drain, especially the lower half of the reservoir. Horizontal wells 323 may also be closely spaced with service well-heads located in tunnel 312. As shown in FIG. 3, horizontal wells 323 and 326 can be interleaved or offset both from the perspective of a side view as shown and from the perspective of a plan view (not shown). Horizontal wells may also be installed from some of the shafts mentioned previously as described for example in U.S. patent application Ser. No. 11/737,578 entitled "Method of Drilling from a Shaft".

Tunnel 312 could be designed as a manned tunnel as it is isolated from the heat of the reservoir. Tunnel 311 may be unmanned after start-up of reservoir heating because of the heat of the reservoir but could be accessed under certain conditions when ventilation can be used to provide a sufficiently cool working environment for limited manned entry. FIG. 3 also shows an example of a gas or water disposal well 324 installed from underground in tunnel 311 and an example of a gas or water disposal well 325 installed from the surface 301. FIG. 3 also shows an example of horizontal wells 321 and 327 installed from the surface 301. For example, wells such as well 321 can be a gas scavenging wells while wells such as well 327 can be steam or heater wells for heating the upper portion of the reservoir. As can be appreciated, horizontal wells or well pairs installed from the surface can also serve as steam injection and production wells. FIG. 3 shows process facilities 313, such as described in FIGS. 1 and 2 located on the surface 301. As can be appreciated some facilities can be located underground in the tunnels and shafts. Examples of these might be well-head apparatuses and power sources for producing steam such as described in U.S. patent application Ser. No. 11/864,011 filed Sep. 28, 2007 entitled "Method of Heating Hydrocarbons" which is incorporated herein by this reference.

By installing wells both from the surface and from underground, it is possible to maximize production, safety and cost effectiveness and, importantly, allow better control of hydrocarbon mobilization, recovery and in-situ upgrading. When a large number of accurately located horizontal wells is required, it is more effective to install them from underground so that cost per installed horizontal well is reduced and well placement accuracy improved. This is because the wells will be shorter by a significant length because they do not have to be drilled, typically at a 45 degree angle, through the overburden. For steam injection wells, energy efficiency is improved by eliminating heat losses in the portion of the wells penetrating the overburden. Gas and water disposal wells installed from tunnels or shafts can be better serviced from underground especially if leakages are detected. Gas and water disposal piping as well as steam and hydrocarbon production piping can be routed down utility shafts where they can be serviced if necessary when safe for manned entry. Electrical cables for power and control can be routed down utility or main access shafts.

Figure 4:
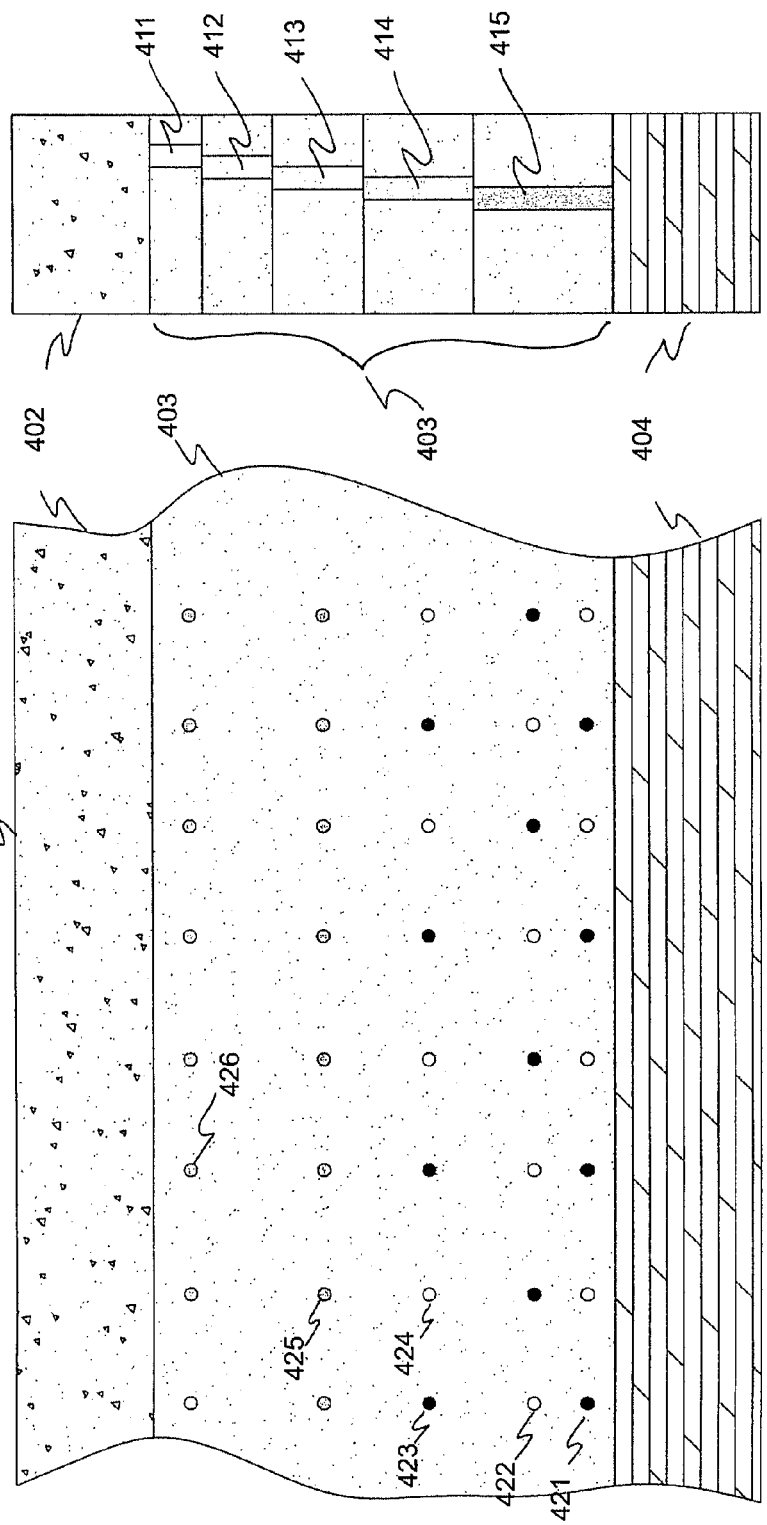
FIG. 4 is a schematic end view of a possible well placement and possible zones of hydrocarbon recovery for the present invention.

FIG. 4 is a schematic end view of a possible well placement and possible zones of hydrocarbon recovery for the present invention. This figure illustrates a complex hydrocarbon recovery operation from another perspective. By controlling the temperature history and temperature spatial distributions of various zones within the reservoir, it is possible to accomplish recovery of mobilized bitumen in the early phases of operation and then to accomplish some upgrading of the remaining bitumen in the middle and latter stages of operation. A typical reservoir section is shown in FIG. 4b showing overburden 402, reservoir zones 403 and basement formation 404. The reservoir 403 is divided into 5 zones in this example, where the top zone 411 may produce NGLs with molecular hydrogen to carbon ratios of about 2.2 (H/C=2.2) grading down to a zone 415 of coke resin (asphaltenes) with molecular hydrogen to carbon ratios of about 1.35 (H/C=1.35). The other zones may produce naphtha (zone 412); jet and diesel (zone 413); and Heavy Vacuum Gas Oil ("HVGO") (zone 414). The approximate pyrolysis temperatures associated with each zone are:

- about 685° C. for zone 415, coke resin
- about 550° C. for zone 414, HVGO
- about 360° C. for zone 413, jet and diesel
- about 150° C. for zone 412, naphtha
- about 60° C. for NGLs in their gaseous forms before conversion into liquid form in the refrigeration plants described in FIGS. 1 and 2.

For a thermal recovery process, the formation must be heated to the approximate range of about 200° C. to about 350° C. to mobilize and recover bitumen. Then, when the desired amount of bitumen is recovered, the lower zone of the formation can be heated to about 685° C. to pyrolize and crack the remaining bitumen. The less dense hydrocarbon fractions will rise and segregate by API gravity as illustrated for example in FIG. 4b, eventually leaving the lowest zone (zone 415) comprised primarily of pyrolized asphaltenes and resins such as coke. In order to achieve first bitumen recovery and then partial upgrading of remaining bitumen and finally recovery of the partially refined products, it is necessary to have excellent control of the temperature histories, levels and profiles in the reservoir by having available an appropriate array of installed wells. This can be best achieved by being able to install a dense network of horizontal well types which can be used for the various purposes described above. It can be shown that for a large number of wells, it is most economical and better well placement accuracy is achieved when the horizontal wells are installed from underground within or in close proximity to the reservoir deposit.

An example of a sectional end view is presented in FIG. 4a showing surface 401, overburden zone 402, reservoir zone 403, basement formation 404 and several horizontal wells. For example, well types 421 and 422 could be installed from underground with well types 421 being heater wells and well types 422 being producing wells or SAGD injector/collector well pairs. Well types 423 and 424 could be installed from underground or from the surface with well types 423 being heater wells and well types 424 being steam injection wells. Well types 425 could be, for example, installed from underground or from the surface and could be production wells for some of the less dense hydrocarbon fractions such as HVGO, jet and diesel and naphtha. Finally, well types 426 could be, for example, installed from the surface and could be scavenging wells for gases liberated during bitumen mobilization and subsequently could be production wells for gases produced by the pyrolysis or for recovering the NGLs.

The bitumen or heavy oil reservoir may be viewed as a combined in-situ recovery and upgrading operation. Initially, the hydrocarbon-bearing formation is typically heated by various means (heating elements, steam injection, steam with diluent injection or some combination of all of these) to mobilize the bitumen or heavy oil. This preferably involves heating the lower portion of the formation to no more than about 300° C. to about 350° C. and the upper portion of the formation to no more than about 200° C. As can be appreciated the vertical temperature profile is graduated from the higher temperature of the lower portion of the reservoir to the lower temperature of the upper portion of the reservoir. During this phase of the operation, the bitumen or heavy oil is mobilized and recovery of mobilized hydrocarbon begins. The maximum temperature of about 350° C. for the reservoir during initial recovery is set such that the temperature is not high enough to initiate coking which would tend to diminish or shut off the flow of hydrocarbons. Once the reservoir is approximately about 60% to about 80% drained of hydrocarbons (the exact percentage being determined by factors such as geology, depth and the like), the temperature profile may be ramped up so as to begin transformation and production of other hydrocarbons. For example, beginning at the top of the reservoir, NGLs grading down to naphtha, jet and diesel, Heavy Vacuum Gas Oil ("HVGO") and finally to coke resin (asphaltenes) as described above. Once the reservoir is approximately about 80% to about 90% drained of hydrocarbons, the temperature profile may be further ramped up so that a maximum temperature of about 685° C. to about 800° C. is reached in the lower portion of the reservoir grading to about 350° C. in the upper portion of the reservoir. Near the end of the process, oxygen may be injected into the bottom of the formation to increase recovery.

A configuration of an in situ process for recovering bitumen or heavy oil and various thermally generated products and byproducts is now described.

In a first stage, a specific well grid system is determined based on a combination of past experience, laboratory and core testing and reservoir simulation. The tighter the grid for heater element and steam injection wells, the greater the recovery.

In a second stage, the well grid system is established to subdivide the underground hydrocarbon deposit into a plurality of portions. Underground shaft and tunnel complexes are developed for installation of various types of mobilizing wells and lower recovery or production wells. Other production wells, gas scavenging vacuum wells, and gas disposal injection wells may be drilled from the surface. The thermal recovery process uses the combination of heating element wells installed into the reservoir from underground; product production wells installed from underground or from the surface; steam injection wells (or steam injection wells with entrained diluents and catalysts) installed from underground or from the surface; gas and water injection disposal wells installed from underground or from the surface; and vacuum gas scavenging wells installed from the surface. Thus, by effective use of surface and underground facilities, the bitumen reservoir is operated as a recovery and partial upgrading facility, thereby substantially reducing energy expenditures and eliminating unnecessary emissions, especially carbon dioxide.

All wells are instrumented with temperature and pressure sensors and automated to duplicate a thermal soaker or coking process.

In a next stage, power and steam is generated by gas turbine co-generation (operations up to about 50,000 bpd) or nuclear plant (operations from about 50,000 bpd to several hundred bpd).

As an example, in a start-up stage, mobilizing wells are brought up to a range of from about 200 to about 250° C. through steam injection and electrical heater wells, then a reservoir temperature profile is applied for mobilizing and recovery of bitumen. Vacuum wells pull −0.5 psig or other optimized value on the top of the reservoir to facilitate the in-situ movement of gases to the top of the reservoir. When the defined portion of the reservoir is up to the selected temperature, a desired amount of bitumen is produced.

In a next stage, the desired amount of bitumen is removed from the defined portion of the underground deposit and the temperature in the lower wells is increased up to a range of about 550 to about 1,000° C., with a temperature of about 800° C. being preferred. The temperature depends on the selected reservoir coking mechanism. A temperature profile over a selected dimension of the production zone is generated to allow for gravity segregation, with ashphaltenes segregating in the (cooler) lower portions of the zone and NGLs in the hotter (upper) portions of the zone or vice versa.

Wells are placed in a fashion that allows production of high API fluid and natural separation based on gravity and temperature. High API products from thermal conversion of bitumen and heavy oil include Heavy Vacuum Gas Oil ("HVGO"), jet, diesel and naphtha.

To assist in cracking of the bitumen and heavy oil, a Fluidized Cracking Catalyst ("FCC") may be injected into the production zone. For example, very small particles of aluminum oxide and silica can be added to steam injected into the formation. These particles will be entrained by the steam and distributed into the formation where they will help catalyze cracking activities in the various temperature zones.

Controlled amounts of steam and or air may be injected into the various levels as a way to add heat.

Produced gases and flue gases, especially $CO_2$, may be injected into the various levels of the reservoir to aid in and act as solvents.

$CO_2$ can be captured and re-injected into the production zone to act as both a solvent in the upgraded portions of the production zone and as a micro-bubble generator for the non-upgraded portions of the production zone.

At later recovery stages, air is injected for partial in-situ combustion.

On the surface, a natural gas refrigeration plant recovers C3+ liquids from the produced gas, and $C_2$—fluids are blown into the Vapor Recovery Unit ("VRU") and combined with $H_2S/CO_2$ for re-injection.

An amine plant sweetens the fuel gas from the Turbine Heat Recovery Steam Generator ("HRSG"). Sour gas (fuel gas from processes such as catalytic cracking and hydrotreating, which contains hydrogen sulphide and carbon dioxide) is treated before it can be used as refinery fuel. Amine plants in petroleum refining remove acid contaminants from sour gas and hydrocarbon streams. In amine plants, gas and liquid hydrocarbon streams containing carbon dioxide and/or hydrogen sulfide are charged to a gas absorption tower or liquid contactor where the acid contaminants are absorbed by counterflowing amine solutions. The stripped gas or liquid is removed overhead, and the amine is sent to a regenerator. In the regenerator, the acidic components are stripped by heat and reboiling action and disposed of, and the amine is recycled.

The Falling Tube Evaporator (FTE) treats water and condensate from the produced fluids and make-up water for steam generation for power and some injection.

Standard techniques are used to treat oil.

Brine water concentrate is disposed into the appropriate geologic layer.

A number of variations and modifications of the invention can be used. As will be appreciated, it would be possible to provide for some features of the invention without providing others. For example, the use of horizontal heating elements could be combined with other extraction technologies advanced from the tunnel or shaft. For example, the heating elements could be used as a formation pre-heater, then the formation could be steamed, solvent injected or other method advanced from the underground workings or the ground surface.

Another method that is covered by the present invention utilizes a cold recovery process such as diluent or solvent injection to mobilize the bitumen or heavy oil for the first phase of the recovery operation. This approach minimizes the amount of energy used and $CO_2$ generated during initial recovery operations (typically, the initial phase of recovery is about 50% to about 60% of total recovery). Thereupon, heating wells are activated to heat the reservoir, continue the mobilization and recovery operations and gradually phase in increased heating to initiate the partial upgrading phase of the operation. This approach may result in minimizing energy requirements and $CO_2$ generation for the overall operation. New diluent and solvent stocks are one of the potential products resulting from in-situ partial upgrading and/or surface refining operations and so may provide a make-up supply of diluents lost in the overall operation.

The methods described herein can be applied to oil sands formations such as the Athabasca oil sands in Alberta, Canada. These methods can also be applied to bitumen or heavy oil deposits in carbonate reservoirs such as the Grosmont Carbonates, also in Alberta, Canada. These methods can also be applied to oil shales such as occur extensively in Colorado and Utah in the United States.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a plurality of mobilizing wells for mobilizing hydrocarbons and a plurality of recovery wells to recover mobilized hydrocarbons, the mobilizing and recovery wells defining a portion of an underground deposit, the defined portion comprising solid, liquid and gaseous hydrocarbons, wherein at least some of the mobilizing wells and/or recovery wells extend from an underground manned excavation;
   (b) for a selected time interval, mobilizing, by the mobilizing wells, hydrocarbons from the defined portion while removing hydrocarbons from the defined portion, wherein, during mobilization, the defined portion is at a first temperature of no more than about 350° C.;
   (c) after a selected time interval, heating a first zone of the defined portion of the deposit to a temperature above 350° C. and sufficient to convert at least a portion of the remaining solid and/or liquid hydrocarbons into at least one of asphaltenes, jet fuel, diesel fuel, and heavy vacuum gas oil; and
   (d) removing the at least one of asphaltenes, jet fuel, diesel fuel, heavy vacuum gas oil and gaseous hydrocarbons from the underground deposit.

2. The method of claim 1, wherein the first temperature is at least about 200° C., wherein the mobilizing wells comprise at least one of steam injectors, diluent injectors, and heating elements, wherein, in step (c), the defined portion is thermally fractionated into a plurality of zones, the first zone having a temperature sufficient to coke resin to form asphaltenes, a second zone having a temperature sufficient to convert hydrocarbons into heavy vacuum gas oil, and a third zone having a temperature sufficient to convert hydrocarbons into at least one of jet and diesel fuel.

3. The method of claim 2, wherein the third zone is closer to a terrestrial surface than the second zone and the second zone is closer to the terrestrial surface than the first zone and further comprising:
   introducing, by a selected well, a fluidized cracking catalyst into the defined portion.

4. The method of claim 3, wherein the defined portion comprises a fourth zone in which hydrocarbons are converted into at least one of naphtha and natural gas liquids and wherein the hydrocarbons comprise bitumen.

5. The method of claim 1, further comprising at least one gas well recovering gas phase hydrocarbons from the defined portion and further comprising, after collection of the removed hydrocarbons and the at least one of asphaltenes, jet fuel, diesel fuel, and heavy vacuum gas oil:
   (e) separating, by a free water knock-out unit, at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil;
   (f) injecting at least a portion of the separated water into the defined portion in the form of steam;
   (g) recovering, by the gas well, a gas-phase hydrocarbon stream;
   (h) separating, by a gas refrigeration plant, the gas-phase hydrocarbon stream into natural gas liquids and a gaseous byproduct stream, the gaseous byproduct stream comprising at least most of the carbon dioxide, hydrogen sulphide, nitrogen oxides, methane, and ethane in the gas-phase hydrocarbon stream;
   (i) removing, by an amine plant and from the gaseous byproduct stream, at least most of the carbon dioxide and hydrogen sulphide to form a product stream comprising at least most of the methane and ethane and a waste stream comprising the removed carbon dioxide and hydrogen sulphide;
   (j) removing, by a carbon dioxide capture apparatus and from the waste stream, at least most of the carbon dioxide; and
   (k) introducing at least a portion of the removed carbon dioxide into a subsurface storage formation.

6. The method of claim 1, further comprising a gas well recovering gas phase hydrocarbons from the defined portion and further comprising, after collection of the removed hydrocarbons and the at least one of asphaltenes, jet fuel, diesel fuel, and heavy vacuum gas oil:
   (e) separating, by a free water knock-out unit, at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil;
   (f) removing, by a falling tube evaporator, impurities from the separated water to form a purified water stream and an impurity-containing water stream;
   (g) injecting at least a portion of the impurity-containing water stream into the defined portion in the form of steam;
   (h) providing the purified water to a boiler for a heat recovery steam generator;
   (i) recovering, by the gas well, a gas-phase hydrocarbon stream;
   (j) separating, by a gas refrigeration plant, the gas-phase hydrocarbon stream into natural gas liquids and a gaseous byproduct stream, the gaseous byproduct stream comprising at least most of the carbon dioxide, hydrogen sulphide, nitrogen oxides, methane, and ethane in the gas-phase hydrocarbon stream;

(k) removing, by an amine plant and from the byproduct stream, at least most of the carbon dioxide and hydrogen sulphide to form a product stream comprising at least most of the methane and ethane and a waste stream comprising the removed carbon dioxide and hydrogen sulphide;

(l) removing, by a carbon dioxide capture device and from the waste stream, at least most of the carbon dioxide; and (m) introducing the removed carbon dioxides into the defined portion as an enhanced oil recovery fluid.

7. The method of claim 1,
wherein hydrocarbons are recovered.

8. A method, comprising:

(a) providing a plurality of mobilizing wells comprising at least one of steam injectors, diluent injectors, and heating elements for mobilizing hydrocarbons, a plurality of heating wells to thermally heat and crack hydrocarbons into desired products, and a plurality of recovery wells to recover mobilized hydrocarbons and products derived therefrom, the mobilizing, heating, and recovery wells being positioned in a selected portion of an underground deposit, the selected portion comprising liquid and gaseous hydrocarbons, wherein at least some of the mobilizing wells, heating wells, and/or recovery wells extend from an underground manned excavation;

(b) for a selected time interval, mobilizing, by the plurality of mobilizing wells, hydrocarbons in the selected portion and removing hydrocarbons from the selected portion, wherein the selected portion is at a first temperature of no more than about 350° C.;

(c) after a selected amount of hydrocarbons are removed from the selected portion, heating, by the heating wells, a first zone of the selected portion of the deposit to a temperature above 350° C. and sufficient to convert at least a portion of the liquid hydrocarbons remaining in the selected portion into at least one of asphaltenes, jet fuel, diesel fuel, and heavy vacuum gas oil; and (d) removing the at least one of asphaltenes, jet fuel, diesel fuel, and heavy vacuum gas oil from the selected portion of the underground deposit.

9. The method of claim 8, wherein the first temperature is at least about 200° C., wherein, in step (c), the selected portion is thermally fractionated into a plurality of zones, the first zone having a temperature sufficient to coke resin to form asphaltenes, a second zone having a temperature sufficient to convert hydrocarbons into heavy vacuum gas oil, and a third zone having a temperature sufficient to convert hydrocarbons into at least one of jet and diesel fuel.

10. The method of claim 9, wherein the third zone is closer to a terrestrial surface than the second zone and the second zone is closer to the terrestrial surface than the first zone and further comprising:

introducing, by a selected well, a fluidized cracking catalyst into the selected portion.

11. The method of claim 10, wherein the selected portion comprises a fourth zone in which hydrocarbons are converted into at least one of naphtha and natural gas liquids and wherein the hydrocarbons comprise bitumen.

12. The method of claim 8, further comprising a gas well recovering gas phase hydrocarbons from the selected portion and further comprising, after collection of the removed hydrocarbons and the at least one of asphaltenes, jet fuel, diesel fuel, and heavy vacuum gas oil:

(e) separating, by a free water knock-out unit, at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil;

(f) injecting at least a portion of the separated water into the selected portion in the form of steam;

(g) recovering, by the gas well, a gas-phase hydrocarbon stream;

(h) separating, by a gas refrigeration plant, the gas-phase hydrocarbon stream into natural gas liquids and a hydrocarbon-containing gaseous byproduct stream, the gaseous byproduct stream comprising at least most of the carbon dioxide, hydrogen sulphide, nitrogen oxides, methane, and ethane in the gas-phase hydrocarbon stream;

(i) removing, by an amine plant and from the gaseous byproduct stream, at least most of the carbon dioxide and hydrogen sulphide to form a product stream comprising at least most of the methane and ethane and a waste stream comprising the removed carbon dioxide and hydrogen sulphide;

(j) removing, by a carbon dioxide capture device and from the waste stream, at least most of the carbon dioxide; and (k) introducing at least a portion of the removed carbon dioxides into a subsurface formation.

13. The method of claim 8, further comprising a gas well recovering gas phase hydrocarbons from the selected portion and further comprising, after collection of the removed hydrocarbons and the at least one of asphaltenes, jet fuel, diesel fuel, and heavy vacuum gas oil:

(e) separating, by a free water knock-out unit, at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil;

(f) removing, by a falling tube evaporator, impurities from the separated water to form a purified water stream and an impurity-containing water stream;

(g) injecting at least a portion of the impurity-containing water stream into the selected portion in the form of steam;

(h) providing the purified water to a boiler for a heat recovery steam generator;

(i) recovering, by the gas well, a gas-phase hydrocarbon stream;

(j) separating, by a gas refrigeration plant, the gas-phase hydrocarbon stream into natural gas liquids and a hydrocarbon-containing gaseous byproduct stream, the gaseous byproduct stream comprising at least most of the carbon dioxide, hydrogen sulphide, nitrogen oxides, methane, and ethane in the gas-phase hydrocarbon stream;

(k) removing, by an amine plant and from the gaseous byproduct stream, at least most of the carbon dioxide and hydrogen sulphide to form a gaseous product stream comprising at least most of the methane and ethane and a gaseous waste stream comprising the removed carbon dioxide and hydrogen sulphide;

(l) removing, by a carbon dioxide capture device and from the gaseous waste stream, at least most of the carbon dioxide; and (m) introducing the removed carbon dioxides into the selected portion as an enhanced oil recovery fluid.

14. The method of claim 8,
wherein hydrocarbons are recovered.

15. A hydrocarbon recovery system, comprising:
mobilizing well means for mobilizing, for a selected time interval, a selected portion of an underground hydrocarbon-containing deposit to a first temperature of no more than about 350° C.;
recovery well means for removing a selected amount of hydrocarbons from the selected portion; and
heating well means for heating a first zone of the selected portion of the deposit to a temperature above 350° C. and sufficient to convert at least a portion of the liquid hydrocarbons remaining in the selected portion into asphaltenes, at least one of jet fuel and diesel fuel, and heavy vacuum gas oil, wherein the recovery well means removes the asphaltenes, at least one of jet fuel and diesel fuel, and heavy vacuum gas oil from the selected portion of the underground deposit and wherein at least some of the mobilizing well means and/or recovery well means extend from an underground manned excavation.

16. The system of claim 15, wherein the first temperature is at least about 200° C., wherein the heating well means thermally stratify the selected portion into a plurality of zones, the first zone having a temperature sufficient to coke resin to form asphaltenes, a second zone having a temperature sufficient to convert hydrocarbons into heavy vacuum gas oil, and a third zone having a temperature sufficient to convert hydrocarbons into at least one of jet and diesel fuel.

17. The system of claim 16, wherein the third zone is closer to a terrestrial surface than the second zone and the second zone is closer to the terrestrial surface than the first zone and further comprising:
catalytic well means for introducing a fluidized cracking catalyst into the selected portion.

18. The system of claim 16, wherein the selected portion comprises a fourth zone in which hydrocarbons are converted into at least one of naphtha and natural gas liquids and wherein the hydrocarbons comprise bitumen.

19. The system of claim 15, further comprising gas well means for recovering a gas phase hydrocarbon stream from the selected portion and further comprising, after collection of the removed hydrocarbons and the at least one of asphaltenes, jet fuel, diesel fuel, and heavy vacuum gas oil:
free water knock-out means for separating at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil, wherein at least one of the heating and mobilizing well means injects at least a portion of the separated water into the selected portion in the form of steam;
gas refrigeration means for separating the gas-phase hydrocarbon stream into natural gas liquids and a hydrocarbon-containing gaseous byproduct stream, the gaseous byproduct stream comprising at least most of the carbon dioxide, hydrogen sulphide, nitrogen oxides, methane, and ethane in the gas-phase hydrocarbon stream;
amine means for removing, from the gaseous byproduct stream, at least most of the carbon dioxide and hydrogen sulphide to form a gaseous product stream comprising at least most of the methane and ethane and a gaseous waste stream comprising the removed carbon dioxide and hydrogen sulphide;
carbon dioxide capture means for removing, from the gaseous waste stream, at least most of the carbon dioxide; and
carbon dioxide well means for introducing the removed carbon dioxides into a subsurface formation.

20. The system of claim 15, further comprising:
gas well means for recovering a gas phase hydrocarbon stream from the selected portion and further comprising, after collection of the removed hydrocarbons and the at least one of asphaltenes, jet fuel, diesel fuel, and heavy vacuum gas oil:
free water knock-out means for separating at least most of the water from the removed hydrocarbons and the at least one of asphaltenes, jet fuel, diesel fuel, and heavy vacuum gas oil to form a de-watered liquid hydrocarbon stream comprising at least most of the removed hydrocarbons and the at least one of asphaltenes, jet fuel, diesel fuel, and heavy vacuum gas oil, wherein at least one of the heating and mobilizing well means injects at least a portion of the separated water into the selected portion in the form of steam;
falling tube evaporator means for removing impurities from the separated water to form a purified water stream and an impurity-containing water stream, wherein at least one of the heating and mobilizing well means inject at least a portion of the impurity-containing water stream into the selected portion in the form of steam;
boiler means for heating the purified water for a heat recovery steam generator;
gas refrigeration means for separating the gas-phase hydrocarbon stream into natural gas liquids and a hydrocarbon-containing gaseous byproduct stream, the gaseous byproduct stream comprising at least most of the carbon dioxide, hydrogen sulphide, nitrogen oxides, methane, and ethane in the gas-phase hydrocarbon stream;
amine means for removing, from the gaseous byproduct stream, at least most of the carbon dioxide and hydrogen sulphide to form a gaseous product stream comprising at least most of the methane and ethane and a gaseous waste stream comprising the removed carbon dioxide and hydrogen sulphide;
carbon dioxide capture means for removing, from the gaseous waste stream, at least most of the carbon dioxide; and
enhanced oil recovery fluid well means for introducing the removed carbon dioxides into the selected portion as an enhanced oil recovery fluid.

* * * * *